(12) United States Patent
Hamatani et al.

(10) Patent No.: US 7,558,182 B2
(45) Date of Patent: Jul. 7, 2009

(54) OPTICAL HEAD AND OPTICAL DISC DEVICE PROVIDED THEREWITH

(75) Inventors: Yutaro Hamatani, Daito (JP); Fumiaki Mori, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 522 days.

(21) Appl. No.: 11/511,374

(22) Filed: Aug. 29, 2006

(65) Prior Publication Data

US 2007/0050803 A1 Mar. 1, 2007

(30) Foreign Application Priority Data

Aug. 30, 2005 (JP) .............................. 2005-248890

(51) Int. Cl.
*G11B 7/00* (2006.01)

(52) U.S. Cl. ............... 369/116; 369/112.01; 369/44.14; 369/121

(58) Field of Classification Search ................... None
See application file for complete search history.

(56) References Cited

U.S. PATENT DOCUMENTS 6,560,188 B1 * 5/2003 Kyoya et al. ........... 369/112.03
7,269,120 B2 * 9/2007 Sogawa et al. ........... 369/244.1
2004/0136310 A1 * 7/2004 Park et al. ................... 369/121
2005/0128895 A1 * 6/2005 Hoshino et al. .......... 369/44.15

FOREIGN PATENT DOCUMENTS

JP    A-2004-348877    12/2004

* cited by examiner

*Primary Examiner*—Muhammad N. Edun
(74) *Attorney, Agent, or Firm*—Morgan Lewis & Bockius LLP

(57) ABSTRACT

To provide an optical head and an optical disc device, in which a cover member for radiating and protecting the optical head and a laser light source are of a simple construction, manufacturing efficiency can be increased, and accuracy variation due to assembly of the laser light source such as an optical axis or the like of a laser beam can be suppressed. Therefore, a boss formed on a light source installation portion of a base is engaged with a boss hole formed on a laser light source supporting portion of the cover member, thereby positioning the cover member on the base. In doing so, an internal thread hole formed on the bottom surface of the base is overlapped with a thread hole formed on a cover portion of the cover member. In this state, a bolt is passed through the thread hole to screw in the internal thread hole.

4 Claims, 7 Drawing Sheets

OPTICAL HEAD AND OPTICAL DISC DEVICE PROVIDED THEREWITH

This application is based on Japanese Patent Application No. 2005-248890 filed on Aug. 30, 2005, the contents of which are hereby incorporated by reference.

BACKGROUND OF THE INVENTION

1. Field of the Invention

The present invention relates to optical disc devices capable of recording and/or reading data by irradiating a laser beam on an optical disc, and, more particularly, relates to an optical head for irradiating a laser beam on the aforementioned optical disc.

2. Description of the Related Art

As recording media of information such as video, audio or the like, optical discs capable of recording and/or reading information by irradiating a laser beam are used. As the aforementioned optical discs, a compact disc (referred to as CD), a digital versatile disc (referred to as DVD) or the like are widely used. Such optical discs are used as recording media, and an optical disc device for recording data on the optical disc and/or reading data from the optical disc includes an optical head, which records data by irradiating a laser beam on the recording surface of the optical disc and reading data by detecting reflected light.

FIG. 2 shows an arrangement view of an optical head. While the optical head shown in FIG. 2 is not limited to this arrangement, illustrated here is a read-only optical head for reading data recorded on an optical disc. As shown in FIG. 2, the optical head has a laser light source Ld, a grating Gr for forming a laser beam irradiated by a laser light source Ld to three beams, a mirror Mr, a collimator lens Lc, an objective lens Lb, a half mirror Hm, and a light receiving element Pd. The laser beam irradiated by the laser light source Ld is formed to three beams by the grating Gr and reflected by the mirror Mr and to be made incident on the collimator lens Lc. The laser beam incident on the collimator lens Lc is emitted as parallel light and is made incident on the objective lens Lb. The laser beam incident on the objective lens Lb is irradiated on the recording surface of an optical disc Ds.

At this time, the laser beam is converged on a recording layer of the optical disc Ds and is irradiated so that the optical axis is perpendicular to the recording layer of the optical disc Ds. The half mirror Hm is a mirror by which a half of the laser beam incident is transmitted and the remaining half is reflected; and is for guiding the reflected light by the optical disc Ds to the light receiving element Pd. The light receiving element Pd is for converting light to current and for reading data according to light intensity.

FIG. 8A shows a bottom view of a known optical head and FIG. 8B shows a side view of the optical head shown in FIG. 8A. An optical head B shown in FIG. 8A and FIG. 8B is provided with a base 91, a laser light source unit 92 mounted on the base 91, a grating Gr for diffracting a laser beam, and a cover member 93 for radiating heat emitted from the laser light source unit 92.

The base 91 has a light source installation portion 911 for arranging the laser light source unit 92; and two each of internal thread holes 912 disposed in a diagonal line and bosses 913 disposed in a diagonal line different from the line in which the internal thread holes 912 are formed, are formed in the light source installation portion 911. Furthermore, an internal thread hole 914 is also formed on the bottom surface of the base 91.

The laser light source unit 92 has a laser light source Ld and a laser holder 922. The laser light source Ld is fixed by press-fitting to a through hole formed on the laser holder 922.

The cover member 93 is one which is mounted to the bottom surface of the base 91 and has a cover portion 931 for covering the bottom surface and a laser light source holding portion 932 for holding in contact with the laser light source unit 92. The cover member 93 has a grating adjustment window 934 for adjusting the grating Gr and an inclination adjustment window 935 for adjusting inclination of an act base 94 that holds an objective lens.

The laser holder 922 press-fitted with a laser light source Ld is arranged in the light source installation portion 911. At this time, the boss 913 of the light source installation portion 911 is arranged so as to pass through a boss hole of the laser holder 922. By being arranged in such a manner, positioning of the laser holder 922 can be performed.

Further, the cover member 93 is mounted so that the boss 913 passed through the laser holder 922 is close-fitted into the boss hole formed in the laser light source holding portion 932 of the cover member 93.

The laser holder 922 and the cover member 93 can be fixed by inserting a bolt Bt from above the cover member 93 to screw in the internal thread hole 912. Tightening behavior of the bolt Bt is adjusted, thereby performing fine adjustment of the angle of the laser light source unit 92 and performing adjustment of the laser light source Ld.

The invention disclosed in Japanese Unexamined Patent Publication No. 2004-348877 shows that an elastically deforming portion is provided on a heatsink and a laser diode and the aforementioned heatsink are thermally coupled to increase heat radiation capacity.

However, a laser holder Lh for press-fitting the laser light source Ld is a metal molded product and needs a complicated process; therefore, equipment for manufacturing the laser holder Lh is required and much time and trouble in processing are required.

Furthermore, when the laser light source Ld is mounted on the laser holder Lh, the laser light source Ld is mainly fixed by press-fitting to a hole provided in the laser holder Lh. When the laser light source Ld is fixed by press-fitting, an unreasonable force is often applied to the laser light source Ld. If an unreasonable force is applied to the laser light source Ld, an emitting unit of the laser beam is subject to face toward an unexpected direction and the laser light source Ld is subject to damage or breakage.

Furthermore, in the case of the invention disclosed in Japanese Unexamined Patent Publication No. 2004-348877, the elastically deforming portion coming in contact with the laser diode needs to be provided, process of the heatsink is complicated, and consequently much time and trouble are required.

SUMMARY OF THE INVENTION

Consequently, it is an object of the present invention to provide an optical head and an optical disc device, in which a laser light source can be mounted to a base by a simple method, variation in accuracy due to a laser light source assembly of an optical axis or the like of a laser beam can be suppressed, and reading data from an optical disc and/or writing data to the optical disc can be stably performed.

Furthermore, it is another object of the present invention to provide an optical head and an optical disc device, in which heat emitted from a laser light source is securely radiated outside, variation in output due to the aforementioned heat of the laser light source is suppressed, and consequently reading data from an optical disc and/or writing data to the optical disc can be stably performed.

To attain the aforementioned object, according to the present invention, there is provided an optical disc for recording and/or reading data by irradiating a laser beam on an optical disc by an optical head, wherein said optical head includes: a base to which a laser light source for irradiating a laser beam is fixed; and a cover member which covers the bottom surface of said base, said base includes a light source installation portion, said light source installation portion having: a light source insertion hole into which a laser beam emitting unit of said laser light source is inserted and that has a key for engaging with a key groove formed on a side surface of said laser light source; at least one boss disposed adjacent to said light source insertion hole; and at least one internal thread hole disposed adjacent to said light source insertion hole and arranged at a position different from that of said boss, said cover member, being shaped so as to cover the entire surface of the bottom of said base, includes: a cover portion having a grating adjustment window for adjusting said granting and an inclination adjustment window for adjusting an inclination of said actuator; and a light source supporting portion having a light source contact portion that has a cylindrical concave shape and that comes in contact with a portion protruded from said light source insertion hole of said laser light source, a light source penetration hole that is formed on said light source contact portion and through which wires of said laser light source pass, a boss hole through which said boss passes, and a bolt hole overlapping with said internal thread hole, and said cover member is mounted by engaging said boss with said boss hole, by engaging said light source contact portion with said portion protruded from said light source insertion hole of said laser light source, and by passing a bolt through said bolt hole to screw in said internal thread hole.

According to this configuration, the laser light source can be mounted without press-fitting to the light source installation portion and therefore a press-fitting process can be omitted; and consequently, time and trouble in processing can be omitted. Thereby, a defect in which the laser light source is damaged or broken due to press-fitting can be reduced.

Furthermore, the laser light source is not press-fitted and therefore the laser light source once inserted in the light source insertion hole and then taken out therefrom can be used again. Thereby, replacement of the laser light source can be made to prolong life of the optical head; and a more appropriate laser light source can be mounted according to an optical system arranged in the optical head and consequently laser irradiation accuracy of the optical head can be increased.

Further, the light source contact portion arranged on the light source supporting portion of the cover member is shaped in a cylindrical concave shape so as to follow the shape of the laser light source and therefore a contact area between the laser light source and the light source contact portion can be increased; and consequently, heat exchange efficiency can be increased. An increase in the temperature of the laser light source is suppressed and therefore variation in output due to the temperature change of the laser light source can be suppressed; and consequently, accuracy in reading data from an optical disc or writing data on the optical disc can be increased.

In order to attain the aforementioned object, an optical disc device according to the present invention includes: a spindle motor for rotating an optical disc; an optical head for irradiating a laser beam on said optical disc; a signal processing device for processing a signal; an external connection unit detected by said optical head, for connecting a signal decoded by said signal processing device to an external video display unit; and a control unit, wherein said optical head includes: a base for fixing a laser light source for irradiating a laser beam, a grating for forming said laser beam to three beams, a half mirror for reflecting a part of said laser beam and transmitting a part, a mirror for reflecting said laser beam, a collimator lens for making said laser beam to parallel light, and a light receiving element for receiving light and converting to an electrical signal; an actuator for holding an objective lens for irradiating said laser beam on said optical disc; and a cover member for covering the bottom surface of said base, said base includes a light source installation portion, said light source installation portion having: a light source insertion hole into which a laser beam emitting unit of said laser light source is inserted and that has a key for engaging with a key groove formed on a side surface of said laser light source; two bosses faced sandwiching said light source insertion hole; and two internal thread holes faced sandwiching said light source insertion hole and arranged at positions different from those of said bosses, said cover member, being shaped so as to cover the entire surface of the bottom of said base, includes: a cover portion having a grating adjustment window for adjusting said grating and an inclination adjustment window for adjusting an inclination of said actuator; and a light source supporting portion that has a cylindrical concave shape and that comes in contact with a portion protruded from said light source insertion hole of said laser light source, a light source penetration hole that is fromed on said light source contact portion and throught which wires of said laser light source pass, boss holes through which said bosses pass, and a bolt hole overlapping with said internal thread hole, and said cover member is mounted by engaging said boss with said boss hole, by engaging said light source contact portion with said portion protruded from said light source insertion hole of said laser light source, and by passing a bolt through said bolt hole to screw in said internal thread hole.

According to this configuration, the laser light source can be mounted without press-fitting to the light source installation portion and therefore a press-fitting process can be omitted; and consequently, time and trouble in processing can be omitted. Thereby, a defect in which the laser light source is damaged or broken due to press-fitting can be reduced.

Furthermore, the laser light source is not press-fitted and therefore the laser light source once inserted in the light source insertion hole and then taken out therefrom can be used again. Thereby, replacement of the laser light source can be made to prolong life of the optical head; and a more appropriate laser light source can be mounted according to an optical system arranged in the optical head and consequently laser irradiation accuracy of the optical head can be increased.

Further, the light source contact portion arranged on the light source supporting portion of the cover member is shaped in a cylindrical concave shape so as to follow the shape of the laser light source and therefore a contact area between the laser light source and the light source contact portion can be increased; and consequently, heat exchange efficiency can be increased. An increase in the temperature of the laser light source is suppressed and therefore variation in output due to the temperature change of the laser light source can be suppressed; and consequently, accuracy in reading data from an optical disc or writing data on the optical disc can be increased.

In order to attain the aforementioned object, an optical head according to the present invention includes: a laser light source for irradiating a laser beam; a grating for taking out light of a specific wavelength from said laser beam; a half mirror for reflecting a part of said laser beam and transmitting a part; a collimator lens for making said laser beam to parallel light; an objective lens for irradiating said laser beam on said optical disc; a light receiving element for receiving light and converting to an electrical signal; an act base for holding said objective lens; a base for fixing said laser light source, said grating, said half mirror, said light receiving element, and said act base; and a cover member mounted so as to cover the bottom surface of said base, wherein said base includes a light source installation portion, said light source installation portion having: a light source insertion hole into which a laser beam emitting unit of said laser light source is inserted and that has a key for engaging with a key groove formed on a side surface of said laser light source; two bosses faced sandwiching said light source insertion hole; and two internal thread holes faced sandwiching said light source insertion hole and arranged at positions different from those of said bosses, said cover member, being shaped so as to cover the entire surface of the bottom of said base, includes: a cover portion having a grating adjustment window for adjusting said grating and an inclination adjustment window for adjusting an inclination of said actuator; and a light source supporting portion having a light source contact portion that has a cylindrical concave shape and that comes in contact with a portion protruded from said light source insertion hole of said laser light source, a light source penetration hole that is formed on said light source contact portion and through which wires of said laser light source pass, boss holes through which said bosses pass, and a bolt hole overlapping with said internal thread hole, and said cover member is mounted by engaging said boss with said boss hole, by engaging said light source contact portion with said portion protruded from said light source insertion hole of said laser light source, and by passing a bolt through said bolt hole to screw in said internal thread hole.

According to this configuration, the laser light source can be mounted without press-fitting to the light source installation portion and therefore a press-fitting process can be omitted; and consequently, time and trouble in processing can be omitted. Thereby, a defect in which the laser light source is damaged or broken due to press-fitting can be reduced.

Furthermore, the laser light source is not press-fitted and therefore the laser light source once inserted in the light source insertion hole and then taken out therefrom can be used again. Thereby, replacement of the laser light source can be made to prolong life of the optical head; and a more appropriate laser light source can be mounted according to an optical system arranged in the optical head and consequently laser irradiation accuracy of the optical head can be increased.

Further, the light source contact portion arranged on the light source supporting portion of the cover member is shaped in a cylindrical concave shape so as to follow the shape of the laser light source and therefore a contact area between the laser light source and the light source contact portion can be increased; and consequently, heat exchange efficiency can be increased. An increase in the temperature of the laser light source is suppressed and therefore variation in output due to the temperature change of the laser light source can be suppressed; and consequently, accuracy in reading data from an optical disc or writing data on the optical disc can be increased.

In order to attain the aforementioned object, an optical head according to the present invention includes: a laser light source for irradiating a laser beam; a base for fixing said laser light source; and a cover member mounted so as to cover the bottom surface of said base, wherein said base includes a light source installation portion, said light source installation portion having: a light source insertion hole into which a laser beam emitting unit of said laser light source is inserted and that has a key for engaging with a key groove formed on a side surface of said laser light source; at least one boss disposed adjacent to said light source insertion hole; and at least one internal thread hole disposed adjacent to said light source insertion hole and arranged at a position different from that of said boss, said cover member, being shaped so as to cover the entire surface of the bottom of said base, includes: a cover portion having a grating adjustment window for adjusting said grating and an inclination adjustment window for adjusting an inclination of said actuator; and a light source supporting portion having a light source contact portion that has a cylindrical concave shape and that comes in contact with a portion protruded from said light source insertion hole of said laser light source, a light source penetration hole that is formed on said light source contact portion and through which wires of said laser light source pass, a boss hole through which said boss passes, and a bolt hole overlapping with said internal thread hole, and said cover member is mounted by engaging said boss with said boss hole, by engaging said light source contact portion with said portion protruded from said light source insertion hole of said laser light source, and by passing a bolt through said bolt hole to screw in said internal thread hole.

According to this configuration, the laser light source can be mounted without press-fitting to the light source installation portion and therefore a press-fitting process can be omitted; and consequently, time and trouble in processing can be omitted. Thereby, a defect in which the laser light source is damaged or broken due to press-fitting can be reduced.

Furthermore, the laser light source is not press-fitted and therefore the laser light source once inserted in the light source insertion hole and then taken out therefrom can be used again. Thereby, replacement of the laser light source can be made to prolong life of the optical head; and a more appropriate laser light source can be mounted according to an optical system arranged in the optical head and consequently laser irradiation accuracy of the optical head can be increased.

Further, the light source contact portion arranged on the light source supporting portion of the cover member is shaped in a cylindrical concave shape so as to follow the shape of the laser light source and therefore a contact area between the laser light source and the light source contact portion can be increased; and consequently, heat exchange efficiency can be increased. An increase in the temperature of the laser light source is suppressed and therefore variation in output due to the temperature change of the laser light source can be suppressed; and consequently, accuracy in reading data from an optical disc or writing data on the optical disc can be increased.

According to the present invention, there can be provided an optical head and an optical disc device, in which a laser light source can be mounted to a base by a simple method, variation in accuracy due to a laser light source assembly of an optical axis or the like of a laser beam can be suppressed, and reading data from an optical disc and/or writing data to the optical disc can be stably performed.

Furthermore, according to the present invention, there can be provided an optical head and an optical disc device, in which heat emitted from a laser light source is securely radiated outside, variation in output due to the aforementioned heat of the laser light source is suppressed, and consequently reading data from an optical disc and/or writing data to the optical disc can be stably performed.

Furthermore, according to the present invention, there can be provided an optical head and an optical disc device using the optical head, in which a laser light source can be mounted to a base by a simple method and variation in accuracy due to a laser light source assembly of an optical axis or the like of a laser beam can be suppressed, and consequently defects can be reduced.

Furthermore, according to the present invention, a holder for mounting a laser light source is not required and therefore trouble and time for mounting the laser light source to the holder can be reduced. The holder is not required to manufacture and therefore trouble, time, material, energy, and the like necessary for manufacturing the holder can be reduced. Thereby, energy and cost can be reduced.

DETAILED DESCRIPTION OF THE PREFERRED EMBODIMENTS

Figure 1:
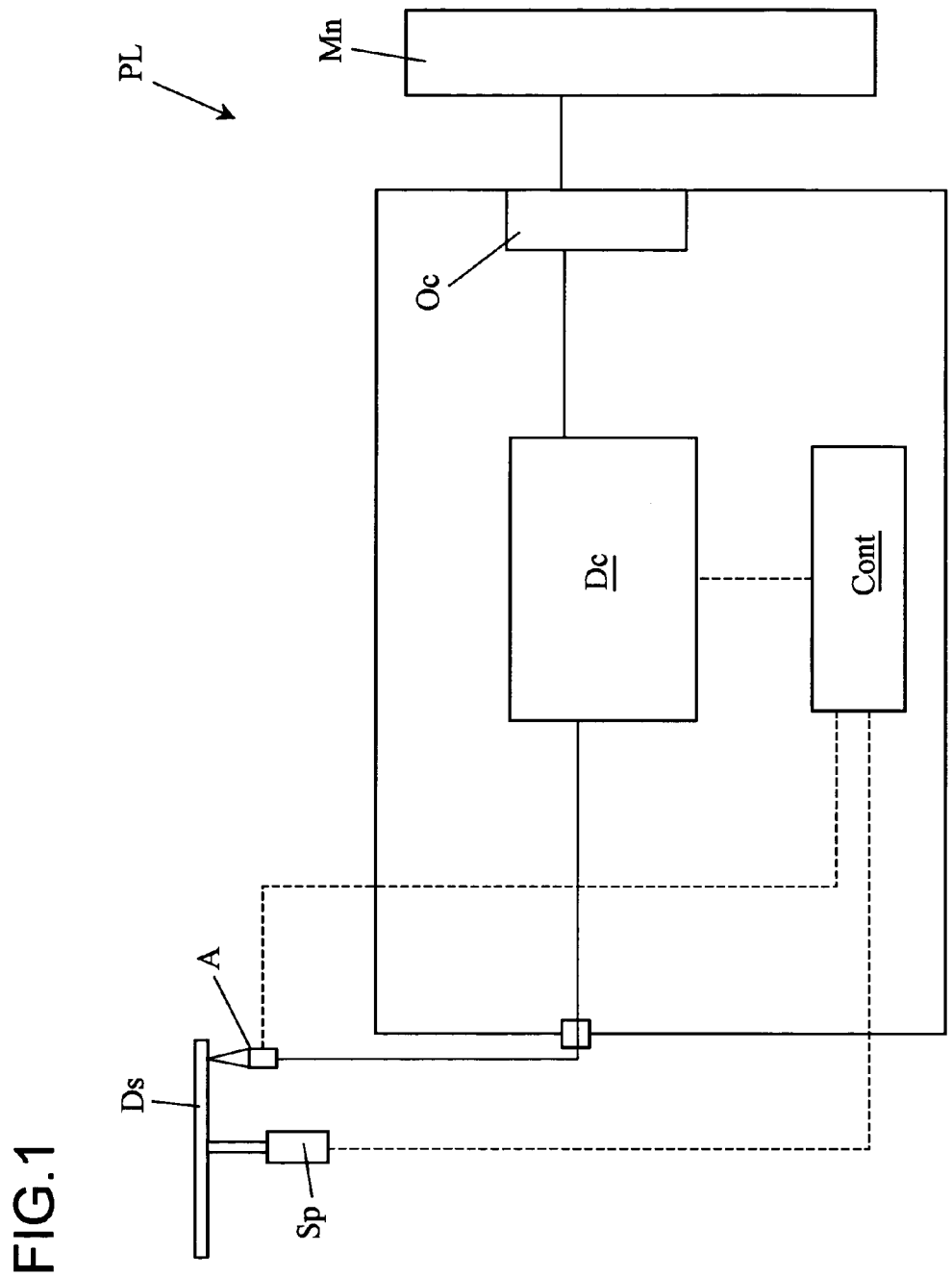
FIG. 1 is an arrangement view showing an optical disc device according to the present invention.

An embodiment of the present invention will be described below with reference to the drawings. FIG. 1 shows an arrangement view of an optical disc device according to the present invention. The optical disc device shown in FIG. 1 a DVD player, but not limited to this. A DVD player PL shown in FIG. 1 includes a spindle motor Sp for rotating an optical disc (DVD recording medium) Ds, an optical head A for irradiating a light on the optical disc Ds to read information, a decoder Dc for decoding a signal detected by the optical head A, an external connection unit Oc for connecting to a monitor Mn which is an external display device, and a control unit Cont.

The DVD player PL is controlled by the control unit Cont; when a user enters a command to reproduce the DVD, the spindle motor Sp is first driven to rotate the optical disc Ds. The optical head irradiates a laser beam on the rotating optical disc Ds and the light reflected is detected by the optical head A. A light receiving element Pd provided in the optical head A, to be described later, is for converting the detected light to an electrical signal, the electrical signal is transmitted to the decoder Dc and demodulated to a video signal, and then transmitted to the monitor Mn via the external connection unit Oc to display video on the monitor Mn.

Figure 2:
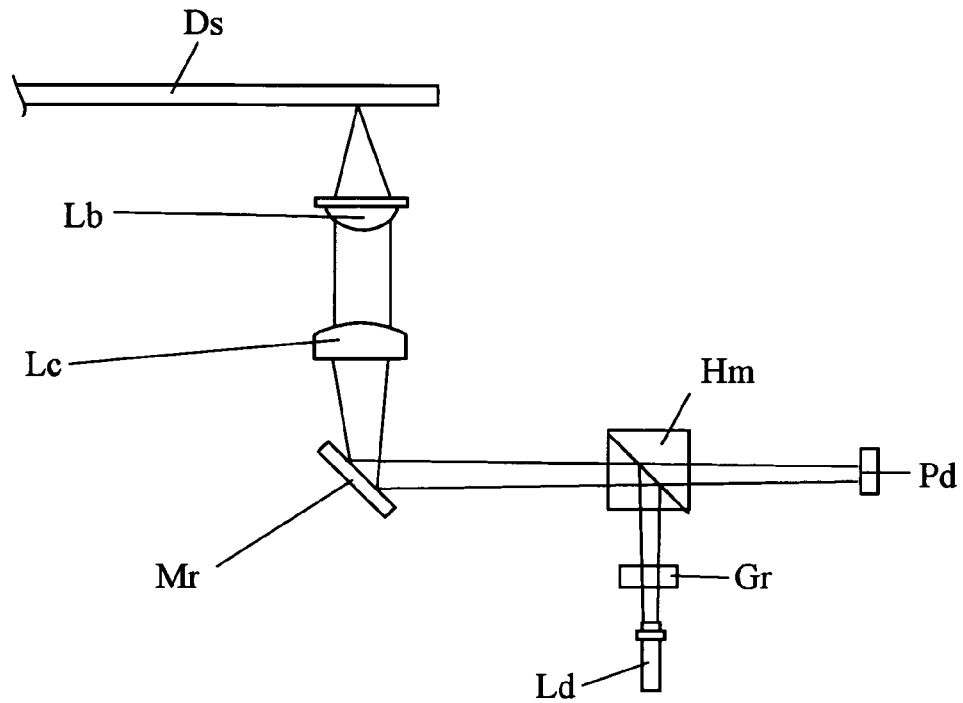
FIG. 2 is an arrangement view showing an optical head.

FIG. 2 shows an arrangement view of an optical head. The optical head shown in FIG. 2 is not limited to it; however, here, a read only optical head for reading data recorded on an optical disc. As shown in FIG. 2, the optical head has a laser light source Ld, a grating Gr in which a laser beam irradiated from the laser light source Ld is formed to three beams, a mirror Mr, a collimator lens Lc, an objective lens Lb, a half mirror Hm, and a light receiving element Pd. The laser beam irradiated by the laser light source Ld is formed to three beams by the grating Gr and reflected by the mirror Mr to be made incident on the collimator lens Lc. The laser beam incident on the collimator lens Lc is emitted as parallel light to be made incident on the objective lens Lb. The laser beam incident on the objective lens Lb is irradiated on the recording surface of the optical disc Ds.

At this time, the laser beam is irradiated so that the laser beam is converged on a recording layer of the optical disc Ds and an optical axis is perpendicular to the recording layer of the optical disc Ds. The half mirror Hm is a mirror by which a half of the laser beam incident is transmitted and the remaining half is reflected and is for guiding the reflected light by the optical disc Ds to the light receiving element Pd. The light receiving element Pd is for converting light to current and is for reading data according to light intensity. The optical head capable of recording data on the optical disc is also basically the same in configuration. Irradiation order of the laser beam on the aforementioned each member is not limited to this; however, it can be made even the order is changed in a possible range.

Figure 3:
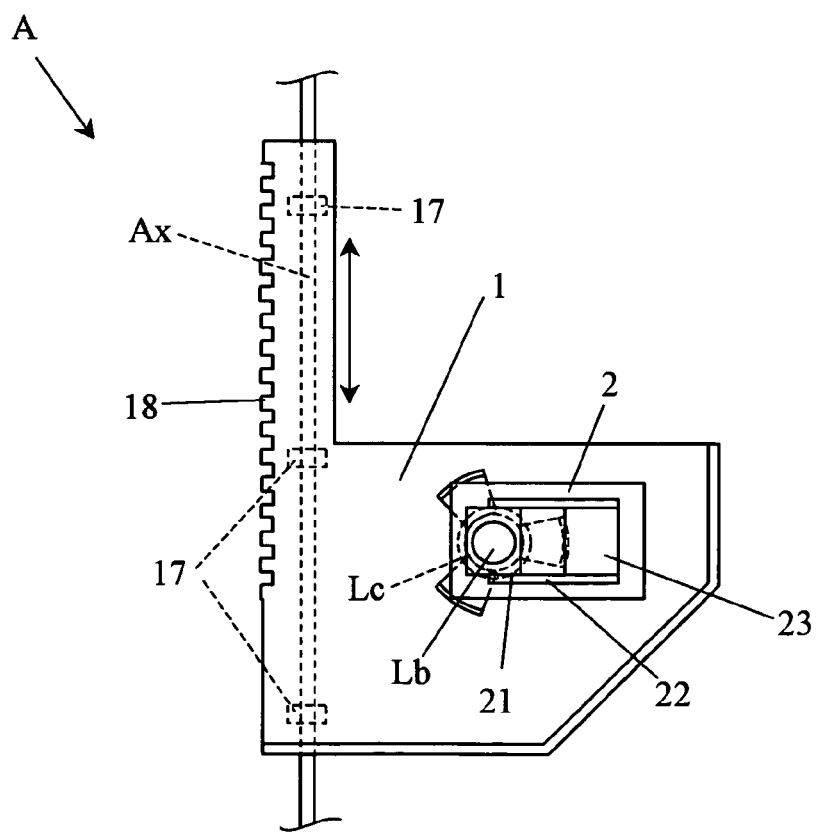
FIG. 3 is a plan view showing an optical head according to the present invention.
Figure 4A:
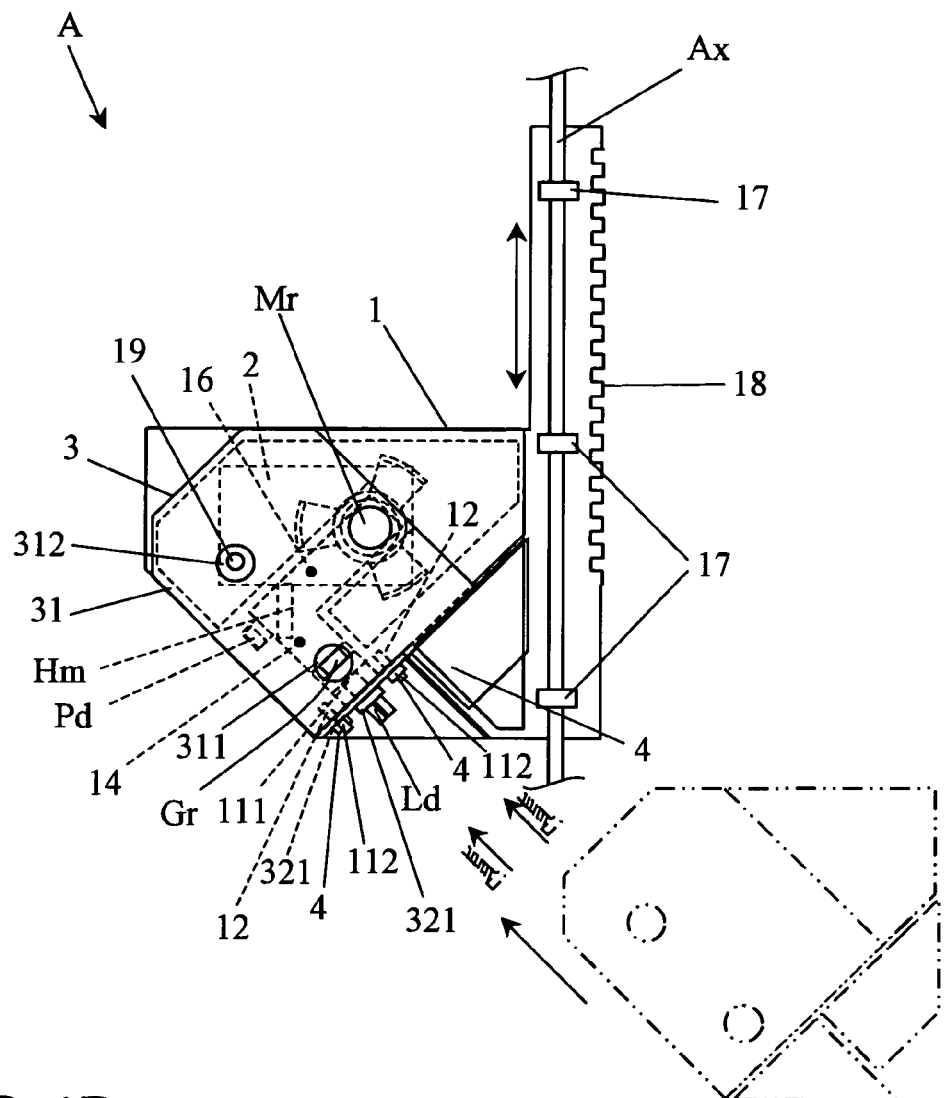
FIG. 4A is a bottom view showing the optical head shown in FIG. 3.
Figure 4B:
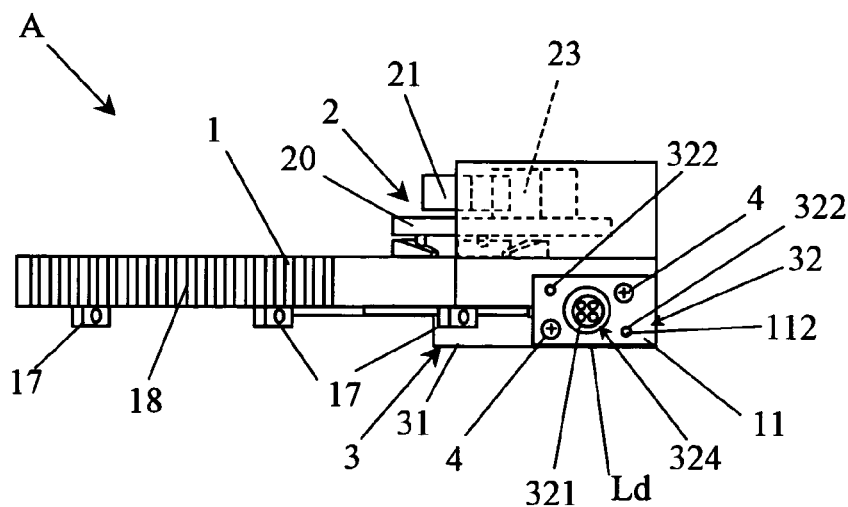
FIG. 4B is a side view showing the optical head shown in FIG. 4A.

FIG. 3 shows a plan view of the optical head according to the present invention, FIG. 4A shows a bottom view of the optical head shown in FIG. 3, and FIG. 4B shows a side view of the optical head shown in FIG. 3. The optical head A shown in FIG. 3, FIG. 4A, and FIG. 4B has a base 1, an actuator 2, and a cover member 3 for covering the bottom surface of the base 1. The cover member 3 is a metal plate (here, an aluminum sheet metal) formed by cutting and bending, but not limited to this.

Figure 5:
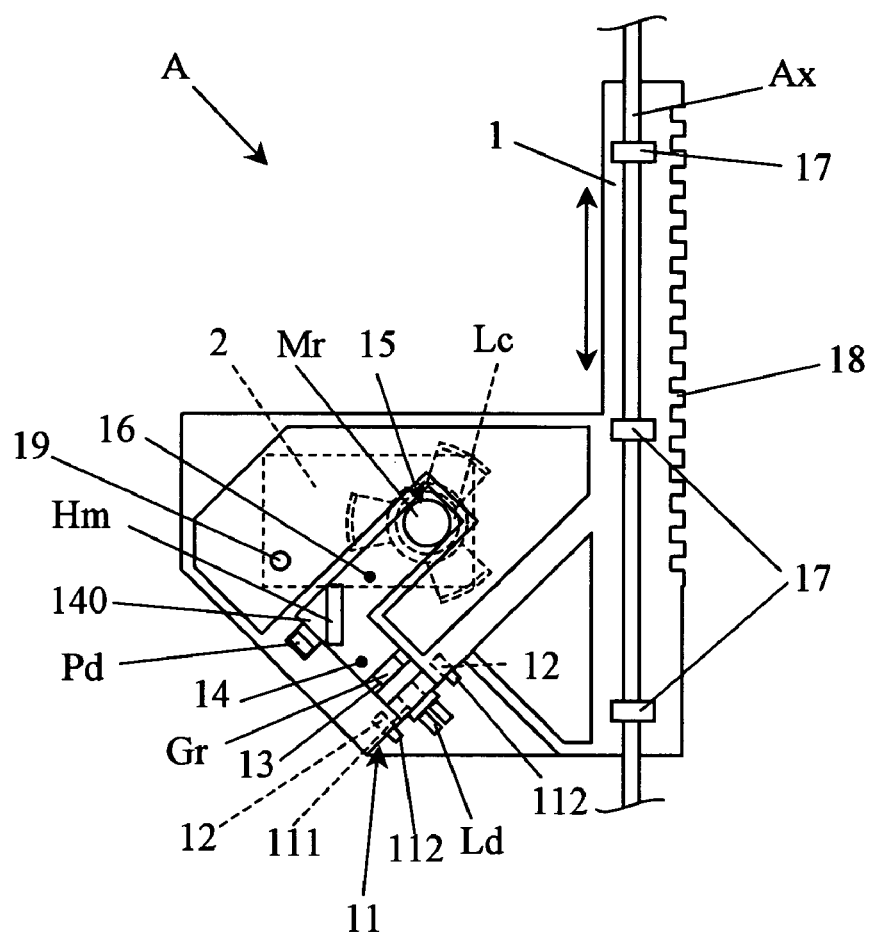
FIG. 5 is a bottom view showing a state where a cover member of the optical head shown in FIG. 3 is removed.
Figure 6A:
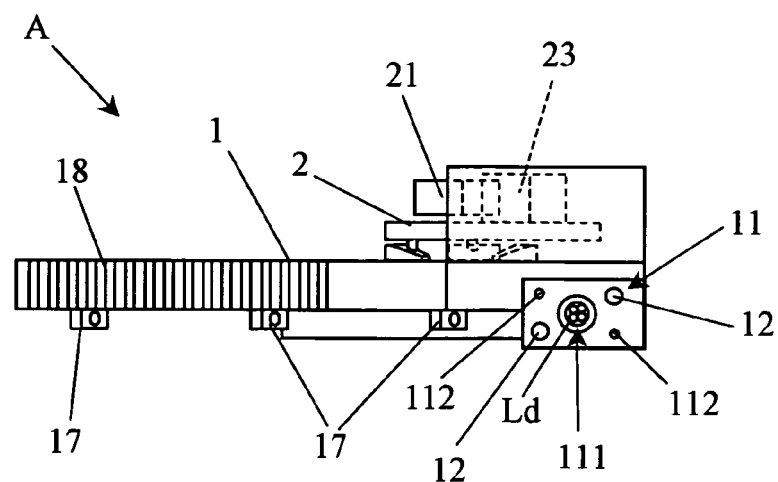
FIG. 6A is a side view showing a state where a cover member of the optical head shown in FIG. 3 is removed.
Figure 6B:
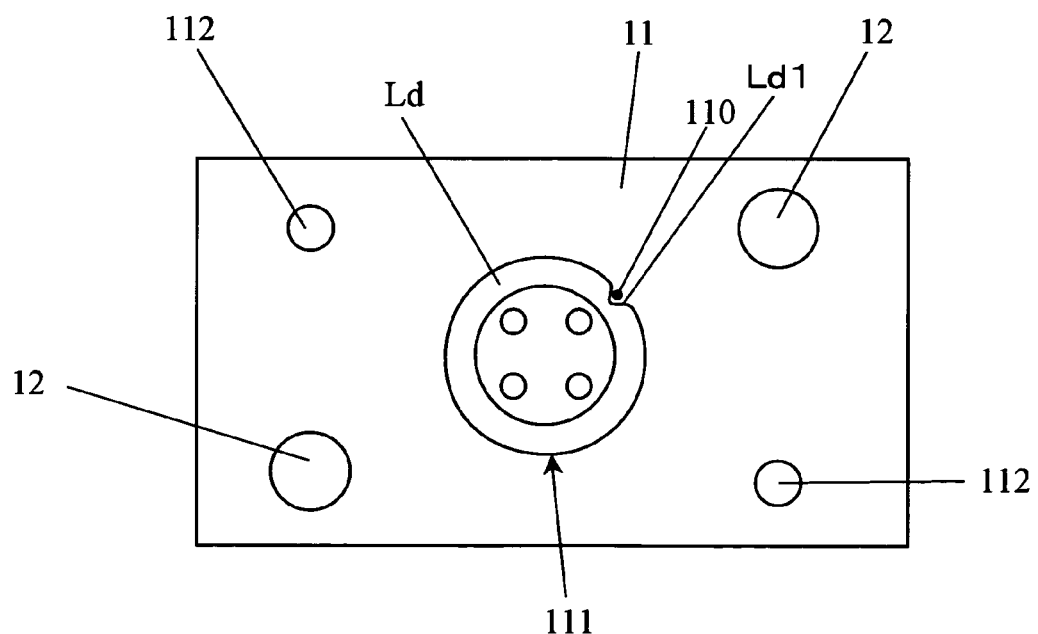
FIG. 6B is an enlarged view showing a light source installation portion of the optical head shown in FIG. 6A.

FIG. 5 shows a bottom view in which the cover of the optical head shown in FIG. 3 is removed, FIG. 6A shows a side view in which the cover of the optical head shown in FIG. 3 is removed, and FIG. 6B shows an enlarged view of a light source installation portion of the optical head shown in FIG. 6A.

The base 1 includes a light source installation portion 11 for attaching the laser light source Ld to the side surface. As shown in FIG. 6B, the light source installation portion 11 includes a light source insertion hole 111 disposed at the substantially center portion for inserting a laser light source Ld, two bosses 112 disposed sandwiching the light source insertion hole 111, and internal thread holes 12 disposed sandwiching the light source insertion hole 111 at positions that are not overlapped with the bosses 112.

A key groove Ldl is formed on the side surface of the laser light source Ld and a key 110 for engaging with the key groove Ldl is formed in the light source insertion hole 111. The laser light source Ld is inserted into the light source insertion hole 111 so as to engage the key 110 of the light source insertion hole 111 with the key groove Ldl of the laser light source Ld, thereby preventing the laser light source Ld from rotating. Thereby, the laser beam emitted from the laser light source Ld can be maintained in a state with high accuracy.

A grating arrangement portion 13 for disposing the grating Gr is arranged at a position adjacent to a light source insertion hole 111 into which the laser light source Ld is inserted. A groove 14 is formed as an optical path in order not to block the laser beam irradiated by the laser light source Ld. The half mirror Hm is disposed at an end 140 opposite to the laser light source of the groove 14 and, at the half mirror, a half of the laser beam is reflected toward the mirror Mr and the remaining half is transmitted.

A through hole 15 through which the laser beam passes is formed at a substantially central portion of the base 1, the collimator lens Lc is formed on the obverse side of the through hole 15, and the mirror Mr is disposed on the reverse side. A groove 16 is formed between the half mirror Hm and the mirror Mr as an optical path so as not to block the laser beam.

The mirror Mr is mounted while being inclined so that the laser beam reflected by the half mirror Hm is reflected by the collimator lens Lc. The laser beam reflected by the mirror Mr is made incident on the collimator lens Lc to become parallel light. The actuator 2 is mounted on the obverse side of the base 1 and the actuator 2 is arranged so that the laser beam is made incident on the objective lens Lb.

The base 1 has sliding holes 17 through which a shaft Ax provided for controlling a sliding direction can slidably pass and a rack gear 18 formed adjacent to the sliding holes 17. The rack gear 18 is engaged with gear not shown in the drawing and slides by rotating the gear.

The actuator 2 has an act base 20, a lens holder 21 for holding the objective lens Lb, and a supporting portion 23 for supporting the lens holder 21 via a wire spring 22. The actuator 2 moves the lens holder 21 using a tracking coil, a focusing coil or the like not shown in the drawing to perform tracking adjustment, focusing adjustment or the like of the objective lens Lb. The actuator 2 is mounted on the base 1 by adjusting so as to suitably irradiating a laser beam on the optical disc Ds.

An inclination adjustment hole 19 for inserting a bolt (not shown in the drawing) that adjusts an inclination of the actuator 2 is formed on the base 1. An inclination of the actuator 2 can be adjusted by adjusting the bolt that passes through the inclination adjustment hole 19 to screw in the actuator 2.

The light receiving element Pd is mounted on the side opposite to the mirror Mr of the half mirror Hm and receives the laser beam transmitted through the half mirror Hm to convert to an electrical signal.

Figure 7A:
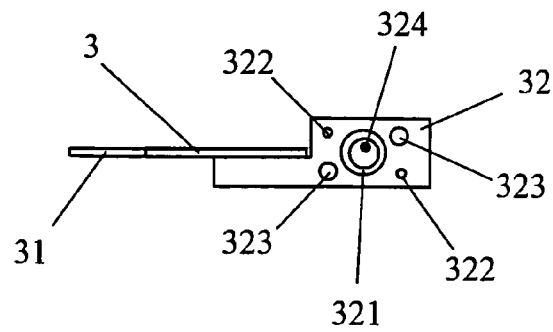
FIG. 7A is a plan view showing the cover member for use in the optical head according to the present invention.
Figure 7B:
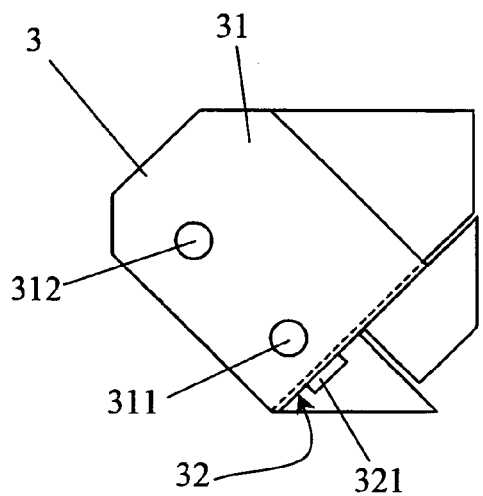
FIG. 7B is a side view showing the cover member shown in FIG. 7A.
Figure 7C:
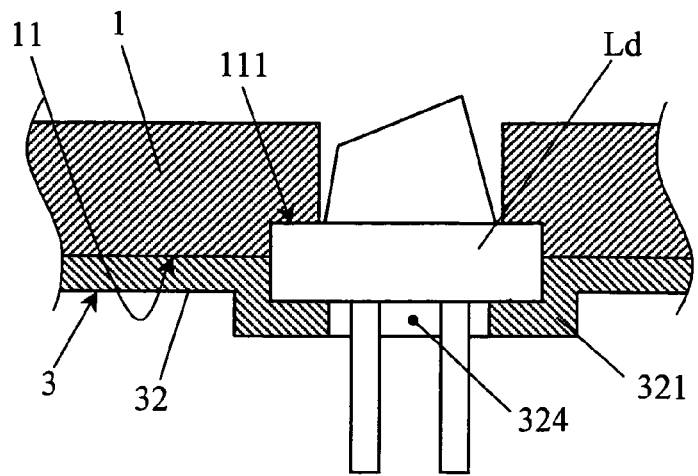
FIG. 7C is an enlarged sectional view showing a light source supporting portion.
Figure 8A:
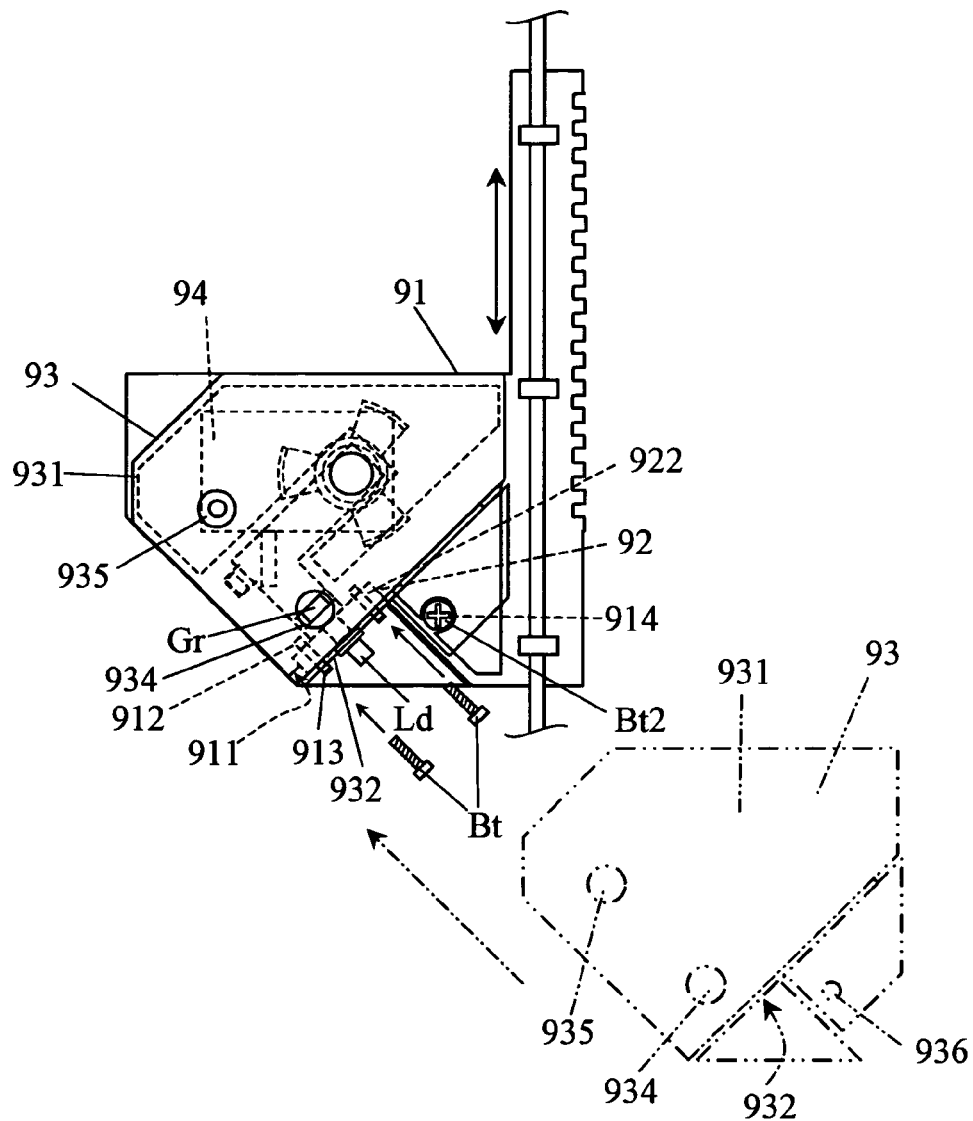
FIG. 8A is a bottom view showing a known optical head.
Figure 8B:
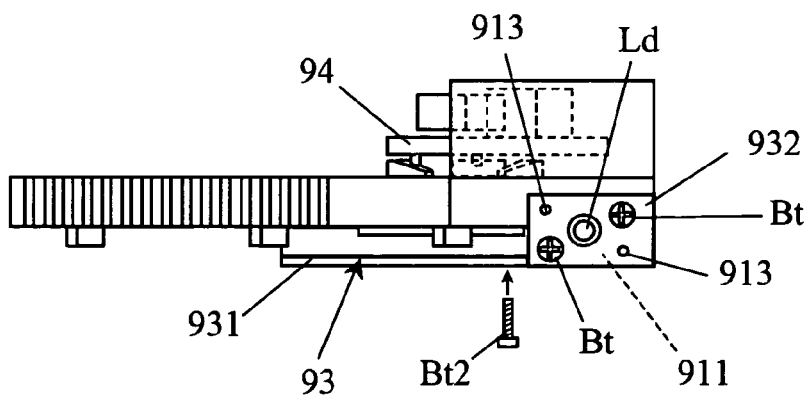
FIG. 8B is a side view showing the optical head shown in FIG. 8A.

FIG. 7A shows a plan view of the cover member for use in the optical head according to the present invention, FIG. 7B shows a side view of the cover member shown in FIG. 7A, and FIG. 7C shows an enlarged sectional view of a laser light source supporting portion. As shown in FIG. 7A and FIG. 7B, the cover member 3 includes a cover portion 31 for covering the bottom surface of the base 1 and a laser light source supporting portion 32 that supports the laser light source Ld and intersects with the cover portion 31. The cover member 3 is formed by, but not limited to, cutting and bending an aluminum sheet by press working.

The cover portion 31 of the cover member 3 has an inclination adjustment window 311 for adjusting the grating Gr formed at a position overlapping the grating arrangement portion 13 and an inclination adjustment window 312 for adjusting an inclination of the actuator 2.

Furthermore, the laser light source supporting portion 32 includes a light source contact portion 321 having a cylindrical concave shape, which engages with a protruding portion of the laser light source Ld disposed in the light source insertion hole 111 that is formed in the light source installation portion 11, boss holes 322 for engaging with the bosses 112 provided in the light source installation portion 11, and bolt holes 323 formed so as to overlap with the internal thread hole 12 formed on the light source installation portion 11.

Furthermore, as shown in FIG. 7C, a light source penetration hole 324 through which wiring for supplying electric power to the laser light source Ld passes the cover member 3 is formed on a central portion of the light source contact portion 321. The cover member 3 covers a portion where the light source contact portion 321 protrudes from the light source insertion hole 111 of the laser light source Ld and is arranged in contact with the laser light source Ld and therefore a contact area between the cover member 3 and the laser light source Ld becomes large.

With this, heat generated by the laser light source Ld can be efficiently transmitted to the cover member 3. The heat transmitted to the cover member 3 is transmitted from the laser light source supporting portion 32 of the cover member 3 to the cover portion 31 to be released into the atmosphere. That is, the heat generated by the laser light source Ld can be effectively radiated and it can be suppressed that the laser light source Ld increases more than the temperature that causes output degradation.

As shown in FIG. 4A and FIG. 4B, when the cover member 3 is mounted on the bottom surface of the base 1, first, the boss 112 formed on the light source installation portion 11 of the base 1 and the boss hole 321 formed on the laser light source supporting portion 32 of the cover member 3 are engaged. The boss 112 is engaged with the boss hole 322, thereby allowing correctly positioning of the cover member 3 with respect to the base 1. That is, the light source contact portion 321 of the laser light source supporting portion 32 of the cover member 3 is arranged in contact with the portion protruded from the light source insertion hole 111 of the laser light source Ld inserted into the light source insertion hole 111.

At this time, the internal thread hole 12 provided in the light source installation portion 11 and the bolt hole 323 of the laser light source supporting portion 32 of the cover member 3 are arranged so as to be overlapped. In this state, the bolt 4 is passed through the bolt hole 323 to screw in the internal thread hole 12, thereby allowing the cover member 3 to be fixed to the base 1. In a state where the cover member 3 is mounted, a part of the laser light source Ld (wiring for supplying electric power to the laser light source) is exposed from the light source penetration hole 324 of the laser light source supporting portion 32, thereby allowing electric power to be supplied to the laser light source Ld by the wiring.

Furthermore, the grating adjustment window 311 for accessing to the grating Gr is formed on the cover portion 31 of the cover member 3, thereby allowing accessing to the grating Gr and allowing the grating Gr to be adjusted without removing the cover member 3. Further, the inclination adjustment window 312 into which screws (not shown in the drawing) for adjusting an inclination of the actuator 2 formed on the obverse side of the base 1 is also formed and therefore the inclination of the actuator 2 can be adjusted even in a state where the cover member 3 is mounted.

The cover member 3 of the base 1 is mounted, whereby it can be suppressed that the laser light source Ld, the half mirror Mr, the light receiving element Pd, and the like are come in contact with articles and are adhered by dirt, dust or the like to be damaged or broken. Furthermore, light other than a laser beam can be prevented from entering from the outside of the optical head A and therefore unnecessary light is not mixed with the laser beam incident on the light receiving element Pd and accurate conversion to an electrical signal can be made by the light receiving element Pd. Furthermore, heat from the laser light source Ld can be efficiently radiated and consequently generation of defects such as damage, failure or the like due to heat of the optical head A can be suppressed.

The optical head according to the present invention can be applied to optical disc devices in which a laser beam is irradiated on optical discs such as DVD, CD, LD or the like to read information and/or to record information on rewritable optical discs.

What is claimed is:

1. An optical disc for recording and/or reading data by irradiating a laser beam on an optical disc by an optical head, wherein
said optical head includes: a base to which a laser light source for irradiating a laser beam is fixed; and a cover member which covers the bottom surface of said base,
said base includes a light source installation portion, said light source installation portion having: a light source insertion hole into which a laser beam emitting unit of said laser light source is inserted and that has a key for engaging with a key groove formed on a side surface of said laser light source; at least one boss disposed adjacent to said light source insertion hole; and at least one internal thread hole disposed adjacent to said light source insertion hole and arranged at a position different from that of said boss,
said cover member, being shaped so as to cover the entire surface of the bottom of said base, includes: a cover portion having a grating adjustment window for adjusting said grating and an inclination adjustment window for adjusting an inclination of said actuator; and a light source supporting portion having a light source contact portion that has a cylindrical concave shape and that comes in contact with a portion protruded from said light source insertion hole of said laser light source, a light source penetration hole that is formed on said light source contact portion and through which wires of said laser light source pass, a boss hole through which said boss passes, and a bolt hole overlapping with said internal thread hole, and
said cover member is mounted by engaging said boss with said boss hole, by engaging said light source contact portion with said portion protruded from said light source insertion hole of said laser light source, and by passing a bolt through said bolt hole to screw in said internal thread hole.

2. An optical disc device comprising:
a spindle motor for rotating an optical disc;
an optical head for irradiating a laser beam on said optical disc;
a signal processing device for processing a signal;
an external connection unit detected by said optical head, for connecting a signal decoded by said signal processing device to an external video display unit; and
a control unit, wherein
said optical head includes: a base for fixing a laser light source for irradiating a laser beam, a grating for forming said laser beam to three beams, a half mirror for reflecting a part of said laser beam and transmitting a part, a mirror for reflecting said laser beam, a collimator lens for making said laser beam to parallel light, and a light receiving element for receiving light and converting to an electrical signal; an actuator for holding an objective lens for irradiating said laser beam on said optical disc; and a cover member for covering the bottom surface of said base,
said base includes a light source installation portion, said light source installation portion having: a light source insertion hole into which a laser beam emitting unit of said laser light source is inserted and that has a key for engaging with a key groove formed on a side surface of said laser light source; two bosses disposed adjacent to said light source insertion hole; and two internal thread holes disposed adjacent to said light source insertion hole and arranged at a position different from those of said bosses,
said cover member, being shaped so as to cover the entire surface of the bottom of said base, includes: a cover portion having a grating adjustment window for adjusting said grating and an inclination adjustment window for adjusting an inclination of said actuator; and a light source supporting portion having a light source contact portion that has a cylindrical concave shape and that comes in contact with a portion protruded from said light source insertion hole of said laser light source, a light source penetration hole that is formed on said light source contact portion and through which wires of said laser light source pass, boss holes through which said bosses pass, and a bolt hole overlapping with said internal thread hole, and
said cover member is mounted by engaging said boss with said boss hole, by engaging said light source contact portion with said portion protruded from said light source insertion hole of said laser light source, and by passing a bolt through said bolt hole to screw in said internal thread hole.

3. An optical head comprising:
a laser light source for irradiating a laser beam;
a grating for taking out light of a specific wavelength from said laser beam;
a half mirror for reflecting a part of said laser beam and transmitting a part;
a collimator lens for making said laser beam to parallel light;
an objective lens for irradiating said laser beam on said optical disc;
a light receiving element for receiving light and converting to an electrical signal;
an act base for holding said objective lens;
a base for fixing said laser light source, said grating, said half mirror, said light receiving element, and said act base; and
a cover member mounted so as to cover the bottom surface of said base, wherein
said base includes a light source installation portion, said light source installation portion having: a light source insertion hole into which a laser beam emitting unit of said laser light source is inserted and that has a key for engaging with a key groove formed on a side surface of said laser light source; two bosses disposed adjacent to said light source insertion hole; and two internal thread holes disposed adjacent to said light source insertion hole and arranged at a position different from those of said bosses,
said cover member, being shaped so as to cover the entire surface of the bottom of said base, includes: a cover portion having a grating adjustment window for adjusting said grating and an inclination adjustment window for adjusting an inclination of said actuator; and a light source supporting portion having a light source contact portion that has a cylindrical concave shape and that comes in contact with a portion protruded from said light source insertion hole of said laser light source, a light source penetration hole that is formed on said light source contact portion and through which wires of said laser light source pass, boss holes through which said bosses pass, and a bolt hole overlapping with said internal thread hole, and said cover member is mounted by engaging said boss with said boss hole, by engaging said light source contact portion with said portion protruded from said light source insertion hole of said laser light source, and by passing a bolt through said bolt hole to screw in said internal thread hole.

4. An optical head comprising:

a laser light source for irradiating a laser beam;

a base for fixing said laser light source; and a cover member mounted so as to cover the bottom surface of said base, wherein said base includes a light source installation portion, said light source installation portion having: a light source insertion hole into which a laser beam emitting unit of said laser light source is inserted and that has a key for engaging with a key groove formed on a side surface of said laser light source; at least one boss disposed adjacent to said light source insertion hole; and at least one internal thread hole disposed adjacent to said light source insertion hole and arranged at a position different from that of said boss, said cover member, being shaped so as to cover the entire surface of the bottom of said base, includes: a cover portion having a grating adjustment window for adjusting said grating and an inclination adjustment window for adjusting an inclination of said actuator; and a light source supporting portion having a light source contact portion that has a cylindrical concave shape and that comes in contact with a portion protruded from said light source insertion hole of said laser light source, a light source penetration hole that is formed on said light source contact portion and through which wires of said laser light source pass, a boss hole through which said boss passes, and a bolt hole overlapping with said internal thread hole, and said cover member is mounted by engaging said boss with said boss hole, by engaging said light source contact portion with said portion protruded from said light source insertion hole of said laser light source, and by passing a bolt through said bolt hole to screw in said internal thread hole.

* * * * *